(12) United States Patent
Wasiq et al.

(10) Patent No.: US 10,409,995 B1
(45) Date of Patent: Sep. 10, 2019

(54) END-TO-END CHANGE TRACKING FOR TRIGGERING WEBSITE SECURITY REVIEW

(71) Applicant: Amazon Technologies, Inc., Seattle, WA (US)

(72) Inventors: Muhammad Wasiq, Vancouver (CA); Nima Sharifi Mehr, Vancouver (CA)

(73) Assignee: Amazon Technologies, Inc., Seattle, WA (US)

( * ) Notice: Subject to any disclaimer, the term of this patent is extended or adjusted under 35 U.S.C. 154(b) by 214 days.

(21) Appl. No.: 15/589,842

(22) Filed: May 8, 2017

(51) Int. Cl.
| | |
|---|---|
| *G06F 21/57* | (2013.01) |
| *H04L 29/06* | (2006.01) |
| *G06F 21/62* | (2013.01) |
| *H04L 9/08* | (2006.01) |
| *G06N 20/00* | (2019.01) |

(52) U.S. Cl.
CPC ........ *G06F 21/577* (2013.01); *G06F 21/6245* (2013.01); *G06N 20/00* (2019.01); *H04L 9/08* (2013.01); *H04L 63/1433* (2013.01); *G06F 2221/033* (2013.01)

(58) Field of Classification Search
CPC ............... G06F 21/577; G06F 21/6245; G06F 2221/033; G06N 20/00; H04L 9/08; H04L 63/1433
See application file for complete search history.

(56) References Cited

U.S. PATENT DOCUMENTS

| | | | |
|---|---|---|---|
| 5,521,910 A * | 5/1996 | Matthews | H04L 12/5602 370/256 |
| 2016/0063398 A1* | 3/2016 | Zhang | G06F 9/5011 706/12 |
| 2018/0032905 A1* | 2/2018 | Abercrombie | G06N 20/00 |

* cited by examiner

*Primary Examiner* — Amir Mehrmanesh
(74) *Attorney, Agent, or Firm* — Davis Wright Tremaine LLP

(57) ABSTRACT

A graph of interrelated computer-executable processes is obtained. That a change has occurred to one of the interrelated computer-executable processes in the graph is determined. A weight of the one of the interrelated computer-executable processes is determined based at least in part on the change. A security review of one or more of the interrelated computer-executable processes is determined to be triggered based at least in part on the weight, and the security review is triggered.

20 Claims, 7 Drawing Sheets

US 10,409,995 B1

END-TO-END CHANGE TRACKING FOR TRIGGERING WEBSITE SECURITY REVIEW

BACKGROUND

Many businesses today utilize web applications for conducting aspects of their business. Thus, given their reliance on such websites, businesses often review the source code of the user interface components of their websites for security vulnerabilities. However, some of these websites are comprised of a large number of user interface components and frequently updated backend services, making it difficult or impractical to perform a security review every time a user interface component or backend service is updated. Consequently, it can take a significant amount of resources and effort to ensure that components are included in a security review to prevent overlooking vulnerabilities that can expose a business to significant risk of exploitation, data loss, or malicious attack.

BRIEF DESCRIPTION OF THE DRAWINGS

Various techniques will be described with reference to the drawings, in which.

DETAILED DESCRIPTION

Figure 1:
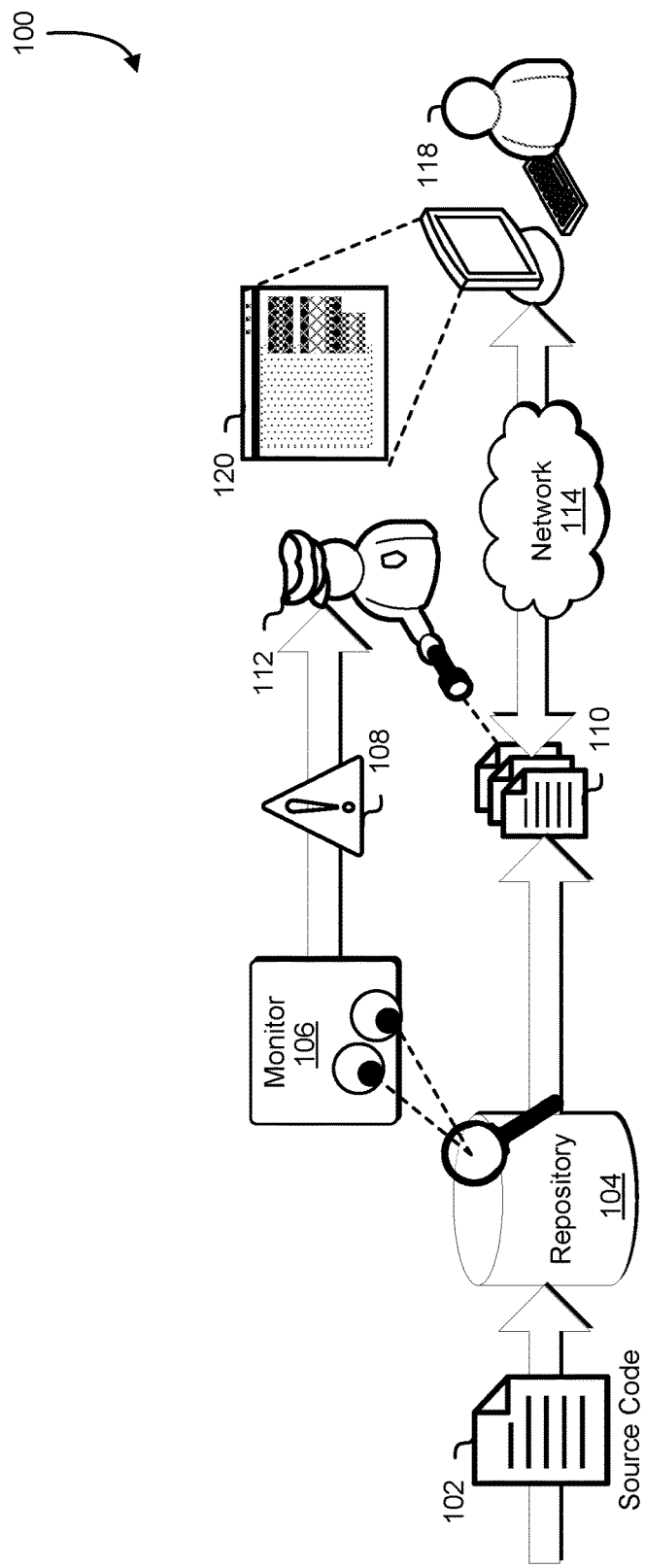
FIG. 1 illustrates an example of monitoring source code changes in accordance with an embodiment.

Techniques and systems described below relate to techniques for determining whether software components should be flagged for security reviews or scans. In one example, a monitoring component keeps track of and assigns weights to code changes along an end-to-end request call path, starting from an application frontend to the last backend service component and including the intermediate backend services. In one example, a component of the system described in the present disclosure tracks request calls initiated by the application frontend and made between the backend services. The component determines a graph (also referred to as an "end-to-end service call graph" or "end-to-end request call graph") of the request path, with the services represented as nodes in the graph and the edges representing communication paths between services. Note that the request calls starting from the application frontend need not necessarily follow a linear path but may take a path in the form of a tree or other graph structure.

In one example, a monitoring component of the system of the present disclosure monitors a repository for changes to code of services represented by nodes in the end-to-end request call graph. For each detected change, the monitoring component may assign a weight to the change based at least in part on the risk or size/amount of change. Various factors may be used to determine risk, such as sensitivity classification of data handled by the changed service, code safety history of the development team that made the change, cyclomatic complexity of the source code of the service, and other factors. The sum of the weights may be compared against a threshold to determine whether to initiate a security review for the application frontend and/or backend services.

Techniques described and suggested in the present disclosure improve the field of computing, specifically the field of computer security, by triggering as-needed security reviews of application components, thereby protecting sensitive information of users and mitigating against exploits of unsecure code by malicious entities. Additionally, techniques described and suggested in the present disclosure improve the functioning and security of computing systems by triggering automatic code scans based on security risks associated with updates to underlying source code. Moreover, techniques described and suggested in the present disclosure are necessarily rooted in computer technology in order to overcome problems specifically arising with large websites that provide extensive functionality supported by multiple backend services by prioritizing security reviews of applications based on a dynamically determined risk associated with source code changes.

In the preceding and following description, various techniques are described. For purposes of explanation, specific configurations and details are set forth in order to provide a thorough understanding of possible ways of implementing the techniques. However, it will also be apparent that the techniques described below may be practiced in different configurations without the specific details. Furthermore, well-known features may be omitted or simplified to avoid obscuring the techniques being described.

FIG. 1 illustrates an aspect of an environment 100 in which an embodiment may be practiced. Specifically, FIG. 1 depicts a repository 104 that receives updated source code 102. The receipt of the updated source code 102 is detected by a monitor 106, which determines whether changes in the updated source code 102 in conjunction with previous updates to source code in an end-to-end path of services associated with an application frontend 120 (also known as a presentation layer) used by a user 118 fulfills conditions for triggering a security review 112 of one or more of the end-to-end path of services associated with the application frontend 120. In some embodiments, the security review 112 is triggered to be performed on services that have changed since their last security review. In other embodiments, the security review 112 is triggered to be performed on services within the end-to-end path regardless whether they have changed since their last security review. Examples of application frontends include a search function on a web page, a frontend for processing a customer order form, a page for managing an online shopping cart, a frontend for package tracking, and so on.

The source code 102 may be a collection of computer instructions written by a software developer in a human-readable programming language. In one embodiment, the source code 102 represents source code prior to being transformed by an assembler or compiler into a set of computer-executable instructions executable by a computing device. In another embodiment, the source code represents the set of computer-executable instructions resulting from compiling or assembling human-readable code written by the software developer. Execution of the source code 102 may result in a running software application. In some examples, a "software application" refers to a computer program designed to perform a group of coordinated functions, tasks, or activities. The source code 102 may include a logical grouping of one or more classes or functions. The repository 104 (also referred to as a "code repository" or "application repository") may be data store for storage and retrieval of data objects, such as database records, flat files, and other data objects including the source code 102. The repository 104 may be a file system, relational database, non-relational database, an object oriented database, a comma delimited file, or some other organized collection of data. In some embodiments, the repository 104 is a distributed repository that is distributed among a plurality of computing devices. The repository 104 may be configured to maintain a historical record (e.g., version control) of the data objects stored within, and may include functionality for rolling back to previous versions of the data object and/or retrieving particular versions of data objects.

The monitor 106 may be a software application that runs within a virtual machine, within the repository 104, or on some other computing device that has access to the repository 104. The monitor 106 may monitor the repository 104 for source code, such as the source code 102, being uploaded to the repository. In some implementations, the repository 104 may be configured (e.g., by a stored procedure or event trigger) to notify the monitor 106 when new or changed source code 102 is uploaded to the repository 104. In some embodiments, the monitor 106 additionally or alternatively detects whether changes to privileges/permissions assigned to the service associated with the source code 102 have been made. For example, the monitor 106 may be configured to detect if a service is granted access (e.g., via an application programming interface by an authorized entity) to a different data store, granted access to a new data store, if the sensitivity of data within a data store to which the service has access changes, or if access permissions to an existing data store have been changed to be more permissive or restrictive. For example, if the service associated with the source code 102 needs to obtain addresses of customers (e.g., residential addresses, email addresses, etc.) and is granted access to a data store having this information, in some embodiments the monitor 106 detects the new grant of access and makes a determination whether the security review 112 is warranted.

In some embodiments, the monitor 106 additionally or alternatively monitors for configuration changes (e.g., changes to a configuration file) of the service associated with the source code 102. In one example, the service could be configured to access a certain data source (e.g., files, databases, etc.). In this example, if the configuration is changed without changing the source code of the service (e.g., via a change to a configuration file, configuration record in a database, etc.) to access a new or different data source, the monitor 106 would detect the configuration change and make a determination whether the security review 112 is warranted. In some embodiments, the monitor 106 additionally or alternatively monitors for changes to classification of the data being processed by the service associated with the source code 102. For example, if the data being processed by the service is classified as more or less sensitive than previously classified, the monitor 106 would detect the classification change and make a determination on whether the security review 112 is warranted.

As a result of detecting or being notified of the change to the service associated with the source code 102, the monitor 106 compares the source code 102 with a preceding version of the source code 102 and calculates a weight for the code change (also referred to as "code churn weight"). The weight assigned to the change may be based on a number of lines changed between the versions of the source code, a security classification for the source code, the track record for safe/unsafe code by the software developer, track record of the software program associated with the source code, whether the software program associated with the source code processes sensitive data, particular permissions or privileges granted to the service, whether the software program associated with the source code has access to encryption or decryption keys, or whether the source code has been verified by an information security team, and so on.

The track record of the software developer (or software development team) could include factors such as how many issues (e.g., documented software errors, flaws, failures or faults) the developer or development team has that are unresolved, how many software applications of the developer or development team have passed security review, timeliness and adequacy of the developer or development team response to security compliance demands, and so on. The track record of the software program may refer to a number and/or frequency of past security patches issue released for the software program, which may be a reflection on the complexity of the software program. The notification 108 may be a message, alert, signal, application programming interface (API) call, or other communication to a component of the system that triggers the security review 112.

In some embodiments, the notification 108 may be a message, alert, signal, API call, or other communication that indicates a level of importance of performing the security review 112. For example, the notification 108 could be a value that reflects the cumulative weights assigned to the changes to the service and could be sent to a telemetry service rather than directly to an entity that performs security reviews. In embodiments, the telemetry service could be configured to aggregate control group metrics (e.g., information about the state of the frontend application and backend services), such as the amount of memory used by processes running the services, number of times that the services triggered a page fault, central processing unit usage by the services, time during which the central processing units were executing system calls on behalf of the services, and so on. The telemetry service may allow customers of the computing resource service provider that hosts the services to configure the telemetry service to send an alarm to another application or service (such as an autoscaling service) when certain control group metrics reach a value relative to a threshold. In the present case, a customer could set a threshold for performing a security review with the telemetry service and, if the cumulative weights determined submitted by the monitor 106 to the telemetry service reaches a value relative to the threshold, the telemetry service could cause the security review, or other action specified by the customer, to be performed.

The services comprising the end-to-end path 110 may be one or more services, in conjunction with the application frontend 120, that perform backend processing (e.g., business logic, data storage, etc.) of one or more operations for the application frontend 120. The services comprising the end-to-end path 110 may perform data processing, data storage, generate user interfaces, perform searches, perform validation on sensitive information (e.g., credit card processing, order processing, etc.), verify user permissions and security policies, perform encryption, and/or other such operations. Some of the services comprising the end-to-end path 110 may communicate with each other, but each of the services need not be configured to communicate with each of the other services comprising the end-to-end path 110.

The services comprising the end-to-end path 110 may also provide secured and/or protected access to each other via encryption keys and/or other such secured and/or protected access methods, thereby enabling secure and/or protected access between the services.

The services comprising the end-to-end path 110 may be distributed among various computing devices of a distributed computer system. In some implementations, the application frontend 120 is considered one of the services comprising the end-to-end path 110. In other implementations, the application frontend 120 is excluded from the backend services in the determination of the services comprising the end-to-end path 110; in some of these implementations, an update to the application frontend 120 automatically results in a security review of the application frontend 120, whereas whether to perform a security review based on a change to one or more of the backend services may be determined based on weights associated with the code changes in the manner described in the present disclosure.

In either case, a set of backend services, application frontends, and various computer-executable processes that call or are called by some other backend service, application frontend, or computer-executable process in the set may be collectively referred to as interrelated computer-executable processes. In some embodiments, an interrelated computer-executable process is comprised of a plurality of interrelated computer-executable processes. For example, a particular computer-executable process may be comprised of or derived from a plurality of software packages deployed to a computing environment. In some examples, a deployed software package (also referred to as a "deployment package") may be one or more written software programs, software libraries, binary files, configuration files, and other data used in the deployment of a computer-executable process. Thus, a change or update to a deployment package for a particular computer-executable process may be imputed to be a change to the computer-executable process itself. Collectively, the interrelated computer-executable processes may provide a collection of related functionality, such as order processing, search functionality, shopping cart management, package tracking, etc. Each collection may have its own application frontend; thus it is possible for multiple application frontends, each directed to executing different business logic, to be present in a single web page or user interface.

The security review 112 may be an examination of source code of one or more software programs. The security review 112 may be intended to identify mistakes introduced into a software application that could render the software application vulnerable to a computer security breach and/or defective execution so that the mistakes can be fixed or any damage caused by the mistakes can be mitigated. In some implementations, the security review 112 includes performance, reliability, or functionality reviews of the source code 102. The security review 112 may scan the software code before or after compilation. The security review 112 may scan source code of the services for vulnerabilities to structured query language (SQL) injection (e.g., un-trusted input), cross-site scripting (XSS), input/data validation, authentication, authorization, sensitive data, code access security, exception management, data access, cryptography, unsafe/unmanaged code, hardcoded secrets, threading, or undocumented public interfaces.

In some examples, SQL injection vulnerability includes vulnerability to input that can modify semantics of a SQL query in an unexpected way. In some examples, cross-site scripting vulnerability includes the ability of injection of script code in an application being executed in the security context of the application. In some examples, data access vulnerability includes improper storage of database connection strings and improper use of authentication to the database. In some examples, an input/data validation vulnerability includes client-side validation that is not backed by server-side validation, poor validation techniques, or reliance on file names or other insecure mechanisms to make security decisions. In some examples, authentication vulnerabilities include weak passwords, clear-text credentials, overly long sessions, and other authentication problems. In some examples, authorization vulnerabilities include improper limits on database access, inadequate separation of privileges, and other authorization problems. In some examples, sensitive data vulnerabilities include mismanagement of sensitive data by disclosing sensitive information in error messages, code, memory, files, or the network. In some examples, unsafe code vulnerabilities refers to code that does not include certain protections normally present in managed code; e.g., unsafe code may lack protections against buffer overflows, out-of-bound array errors, integer underflow and overflow, or data truncation errors. In some examples, unmanaged code vulnerabilities include the use of potentially dangerous APIs, such as strcpy and strcat, and other potentially dangerous APIs. In some examples, hard-coded secrets include variable names that betray their contents as sensitive information, such as a variable named "key," "password," "pwd," "secret," "hash," or "salt." In some examples, exception management vulnerabilities include functions with missing error handlers or empty catch blocks. In some examples, code access security vulnerabilities include the use of asserts, link demands, and an allowPartiallyTrustedCallersAttribute (APTCA). In some examples, cryptography vulnerabilities include failure to clear secrets as well as improper use of cryptography APIs. In some examples, undocumented public interface vulnerabilities include APIs unintended for use by the public. In some examples, threading vulnerabilities include the potential for race conditions and deadlocks, especially in static methods and constructors.

In some embodiments, the security review 112 is a manual review of the application frontend 120 and/or one or more of the services within the end-to-end path 110. In other embodiments, the security review 112 is an automated review of the application frontend 120 and/or one or more of the services within the end-to-end path 110. In still other embodiments, the security review 112 is a combination of manual and automated reviews of the application frontend 120 and/or one or more of the services within the end-to-end path 110. For example, in one implementation, the security review 112 is a review of only the application frontend 120, whereas in another implementation the security review 112 involves a review of all of the services within the end-to-end path 110. In still another implementation, upon determining that a security review 112 is warranted, the services whose individual weights reach a value relative to a threshold (e.g., meet a threshold, exceed a threshold, etc.) are reviewed while other services whose weights do not exceed the threshold may or may not be reviewed. In some embodiments, services within the end-to-end path 110 that have changed since their last security review are reviewed, while in other embodiments services within the end-to-end path 110 are reviewed even if they have not changed since their last security review (e.g., in order to confirm that changes to other services have not introduced or affected the security of the unchanged service). In some embodiments, a threshold is dynamically determined (e.g., the system of the present disclosure may dynamically calculate a threshold such that security reviews are performed according to a specified frequency). In some embodiments, the threshold can be set by security personnel of a computing resource service provider. In some embodiments, thresholds are set individually for each end-to-end path tracked.

The network 114 may represent a path of communication between the user 118 and the computer resource service provider hosting the repository 104. Examples of the network include the Internet, a local area network, a wide area network and Wi-Fi. In some examples, the user 118 refers to an entity that utilizes services provided by the computing resource service provider that provides services comprising the end-to-end path. The user 118 may be one or more of individuals, computing systems, applications, services, resources, or other entities able to utilize the application frontend 120.

The application frontend 120 (also referred to as a "frontend module") may be a software application, such as a website application, or user interface component providing functionality to such a software application. Note that although the present disclosure refers to the application frontend 120 and backend services as supporting a website, it is contemplated that the techniques described may be applied to other applications besides website applications. For example, the techniques may be applied to an organization's enterprise software that is made of a collection of computer programs that are not necessarily web/browser-based.

The application frontend 120 may be supported by a series of one or more other services or backend applications. For example, an application frontend X may rely on processing from service A, service B, service C, and service D (in this case, the end-to-end path of services would include application frontend X, service A, service B, service C, and service D). In some implementations, the individual services are called directly by the application frontend 120. In other implementations, in processing a request, the application frontend calls a service, which in turn calls another service, and so on. In still other implementations, in processing a request, the application frontend calls one or more services, which themselves may call one or more services, and in some cases a service may call a service that has been previously called during the request processing (e.g., recursive calling). However, in determining the end-to-end path of services, each called service during request processing may be counted only once. Thus, the request path may follow a linear route, looping route, or tree structure, but each service within the path may only be counted once for the purposes of determining whether to trigger the security review 112. Thus the end-to-end path of services may alternatively be referred to as an "end-to-end call graph" or "end-to-end call chain." However, it is contemplated that, in some embodiments, repeated calling of certain services affect how the services are weighted in the determination of whether to trigger the security review 112.

Figure 2:
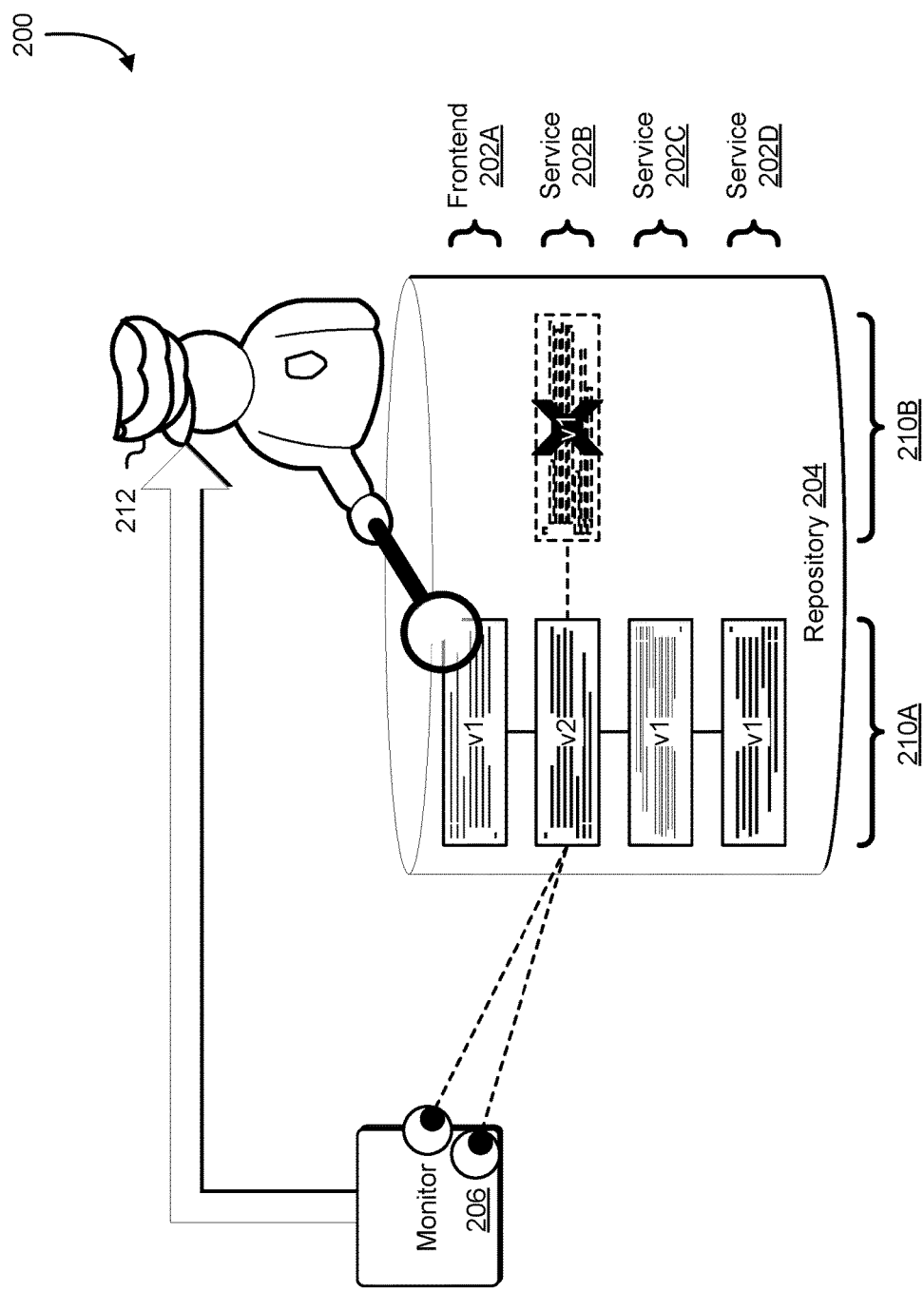
FIG. 2 illustrates an example of monitoring source code changes in a repository in accordance with an embodiment.

FIG. 2 illustrates an aspect of an environment 200 in which an embodiment may be practiced. As illustrated in FIG. 2, the environment 200 may include a monitor 206 that monitors a code repository 204 for changes to application source code 210A-210B and triggers a security entity 212 to perform a security review of the active source code 210A if the changes indicate a sufficient (e.g., reaches a value relative to a threshold) risk.

The monitor 206 may be similar to the monitor 106 of FIG. 1. The code repository 204 may be similar to the repository 104 of FIG. 1. The interrelated computer-executable processes 202A-202D may be a collection of related functionality executable by a computer. The interrelated computer-executable processes 202A-202D may include an application frontend 202A and a set of backend services 202B-202D supporting the application frontend.

The security entity 212 may be one or more of individuals, computing systems, applications, services, resources, or other entities that perform security reviews of computer-executable applications in a manner similar to those described in the present disclosure. The application source code 210A-210B may, individually, be similar to the source code 102 of FIG. 1. The active source code 210A illustrates the source code for the interrelated computer executable processes that are in current use. Previous source code 210B refers to previous/earlier versions of the active source code 210A still in the repository 204.

In the environment 200, the source code for service 202B has been updated from version 1 in the previous source code 210B to version 2 in the active source code 210A. This causes the monitor 206 to evaluate the update/change to determine a weight to assign to the change. As described in the present disclosure, this weight will be summed with weights of other changes since the last security review, and it must be noted that, in some embodiments, the update/change to source code that is evaluated is the change from the source code at the state of the last security review, which may not necessarily be the previous version. In other embodiments, the weight of the most recent update is summed with the weight of previous updates. In other words, in either case if particular source code undergoes multiple minor updates, the weight assigned to the update takes into account previous minor updates, which in the aggregate may effectively be a major update from the code in the state it was in at the last security review.

The monitor 206 sums up this weight along with weights of changes made to the other interrelated computer-executable processes 202A, 202C-202D since the last security review of the active source code 210A. If the summed up weight reaches a value relative to a threshold, the monitor 206 communicates to the security entity 212 to cause a security review to be performed. In some embodiments, the security review is performed at least to the active source code of the frontend 202A. In other embodiments, the security review is performed at least to the active source code that has changed since the last security review. In still other embodiments, the security review is performed on the source code 210A of one or more of the interrelated computer-executable processes.

Figure 3:
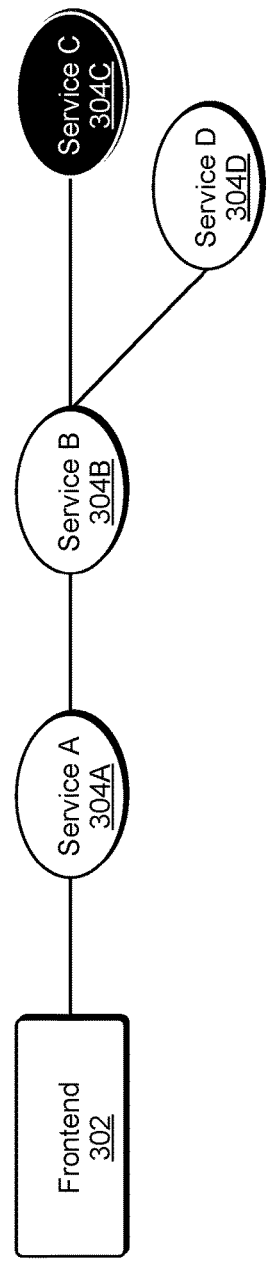
FIG. 3 illustrates an example of an end-to-end service call graph in accordance with an embodiment.

FIG. 3 illustrates an end-to-end call graph 300 of an embodiment of the present disclosure. Specifically, FIG. 3 depicts a frontend 302 supported by backend services 304A-304D. In some examples, the term "graph" refers to the discrete mathematical structure of a set of related objects (nodes) linked by edges. The end-to-end call graph 300 may be determined in various ways. For example, the computing resource service provider that hosts the services may have a service (recording service) that follows every "hop" on the call path to record the service caller and callee. In one example, a caller passes an identifier associated with the request (request ID) and an identifier associated with the callee (callee ID) or itself (caller ID) to the recording service. In another example, a callee passes the request ID and the callee ID or caller ID to the recording service. In one embodiment, the identifiers are included as a parameter of the request, such as in a HyperText Transfer Protocol (HTTP) header of the request.

By aggregating the hops, the recording service can map out through which services the request has travelled and build the end-to-end call graph from this information. In still another example, each request includes a request ID and/or a collection of identifiers of all of the previous callers such that the recording service can determine the call path from the final request in the service call path. In some implementations the recording service tracks requests of the "live" (available for use by individuals) applications/services, whereas in other implementations the recording service tracks the requests during a testing phase of the applications/services. It is contemplated that other methods of determining the call path may be utilized. For example, in some implementations, the service call path is determined by a service or other application that scans/parses the application source code of the various frontends and backend services to determine which services call which other services, thereby dynamically constructing the end-to-end request call paths from the source code.

A single website may have one or more frontends similar to the frontend 302. The backend services 304A-304D (also referred to as "downstream nodes") may provide various supporting functionality for the frontend 302. As an illustrative example, the frontend 302 could be a web page for ordering a consumer product. As an illustrative example, the consumer makes a selection of a product, enters payment information, and selects to confirm purchase of the order. As an illustrative example, the backend service A 304A may be called by the frontend 302 to confirm that the consumer's payment information is valid. Upon confirmation, the backend service B 304B may then be called by the backend service A 304A to charge the ordered price to the customer's credit card or other payment method. Next, the backend service B 304B may then call the backend service C 304C which removes the selected product from inventory, and, in parallel, call the backend service D 304D to cause a confirmation email to be sent to the consumer.

Thus, the frontend 302 may initiate the process by making a request call to the backend service, such as the backend service 304A, to perform an operation (e.g., keyword search, order processing, user login, etc.). The called service may itself make a request call to another service, such as the service 304B, to perform another operation (e.g., authenticate to a database, check credit risk, validate credentials, etc.). In this manner, the request calls may propagate from service to service, and the path of propagation comprises the end-to-end service call graph. Thus, for each frontend, the system of the present disclosure tracks the path of a request as it propagates from the frontend to the last-called service of the end-to-end path. Note that the request call propagation may not be linear; for example, in the end-to-end call graph 300 the service B 304B makes request calls to both the service C 304C and the service D 304D. In some implementations, the service C 304C also makes request calls to the service D 304D. Thus, the end-to-end call graph may be a tree structure or acyclical. Thus, reference to the "last-called service" may not necessarily be the end of the longest path or branch of the graph.

As noted, FIG. 3 depicts the end-to-end call graph 300 (also referred to as an "end-to-end request processing graph") of the frontend 302, with the end-to-end call graph 300 including the frontend 302 and the backend services 304A-304D. The end-to-end call graph 300 may be associated with an aggregate weight. The aggregate weight may reflect an aggregation of weights associated with the changes to the backend services 304A-304D since the last security review of the frontend 302 and/or the backend services 304A-304D. To that end, the frontend 302 and the backend services 304A-304D are monitored, such as by the monitor 106 of FIG. 1 for changes to their respective source code.

In FIG. 3, service C 304C has experienced a software update/code change. A weight is assigned, such as by the monitor 106, to the change associated with the service C 304C. The weight (also referred to as "code churn weight") may be based on one or more factors, including an amount of risk associated with the change, cyclomatic complexity of the source code associated with the code change, or the size of the code change. An amount of risk associated with the change may be affected by sensitivity of the data processed by the service (e.g., cryptographic keys, personally identifiable information (PII), whether the data is sent in plaintext or encrypted, etc.). The size of the code change may be based on the number of lines of code changed, a difference in file size, the proportion or percentage of the number of lines changed to the total number of lines in the source code, or some other measure of size of a code change.

The amount of risk associated with the change may additionally or alternatively be affected by the privileges/permissions associated with the services whose source code has changed. For example, a change to ten lines of source code of a service with very permissive privileges (e.g., privileges that would permit the service to access sensitive data, access cryptographic keys, make changes to certain data, perform administrative functions, change permissions of other entities, etc.) might be given greater weight than a change to ten lines of source code of a service with more restrictive privileges (e.g., limited ability to change or access certain data, etc.).

As noted, the cyclomatic complexity of the source code associated with the changed service may additionally or alternatively be a factor in determining the weight to assign to the change. In some examples, "cyclomatic complexity" refers to a metric that indicates the complexity of a software program. For example, cyclomatic complexity could indicate a number of linearly independent paths through a software program's source code as computed through a control flow graph of the software program. For example, a change to source code that does not add, modify, or delete control flow statements (e.g., conditionals or decision points) in some embodiments would be conferred less weight than a change to source code that does add, modify, or delete one or more control flow statements (e.g., "if . . . then" statements, switch/case statements, condition/collection-controlled loops, exception control statements, etc.).

The weights of all code changes to the nodes in the end-to-end call graph 300, which in the FIG. 3 illustration is only the service C 304C, are summed and compared to a threshold value. The threshold value indicates the point at which the security review is triggered. In some implementations, a change/update to cryptographic key material (e.g., key rotation) used by the service is considered commensurate to a source code change and is assigned a weight.

Thus, if the summed weights reach a value relative to the threshold value (e.g., meet or exceed the threshold value), the security review is triggered for the frontend 302 and the weights of all code changes to the nodes in the end-to-end call graph are reset. On the other hand, if the summed weights do not reach the value relative to this threshold, the security review is not triggered and the summed weights may be added to the weights of the next code change. In this manner, previous code changes are not disregarded when determining whether the overall code churn of the end-to-end call graph 300 should trigger a security review of the frontend 302 and the backend services 304A-304D in the end-to-end call graph. For example, in FIG. 3, the monitor 106 may determine that the software update of the service C 304C, combined with any previously held summed weights, is not of sufficient weight to trigger a security review of the frontend 302 and the backend services 304A-304D.

Note that the backend services 304A-304D need not necessarily be specific to the frontend 302. That is, one or more of the backend services may be associated with other frontends of the web site or other areas in the computing environment. Thus, although the change to the source code of the service C 304C in this case did not trigger a security review for the frontend 302, it may be that the change to the source code of the service C 304C was sufficient (e.g., exceeded a threshold value) to trigger a security review for a different frontend that happens to utilize the service C 304C in its own end-to-end call graph. In some implementations, if the security review for the other end-to-end call graph fails, a security review of the services within the end-to-end call graph of the frontend 302 is automatically triggered. As a result of triggering the security review of the frontend 302, the summed weights for the end-to-end call graph 300 may be reset.

Figure 4:
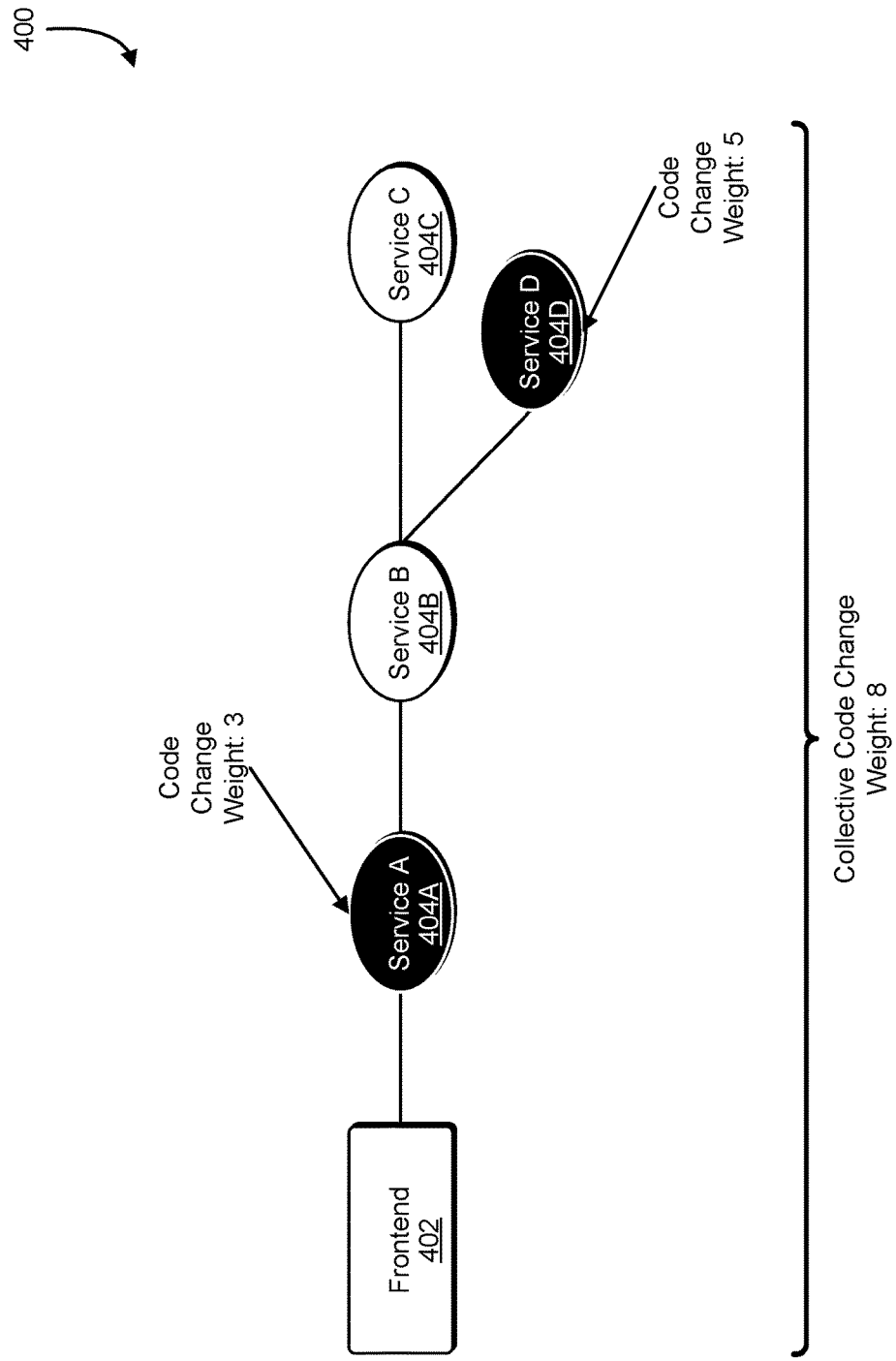
FIG. 4 illustrates an example of calculation of code churn weight in accordance with an embodiment.

FIG. 4 illustrates an end-to-end call graph 400 of an embodiment of the present disclosure similar to the end-to-end call graph 300 of FIG. 3. In the case illustrated by FIG. 4, the service A 404A and the service D 404D have both been updated since the last security review associated with the frontend 402. The frontend 402 may be similar to the frontend 302 of FIG. 3. The backend services 404A-404D may similar to the backend services 304A-304D of FIG. 3. In the case illustrated in FIG. 4, the code churn weight computed for the change to the service A 404A, based on factors that could include size of the change, sensitivity classification of the data handled by the service A 404A, and/or privileges associated with the service, amounts to 3. Similarly, the code churn weight computed for the service D 404D based on such factors amounts to 5. In the event that the threshold value for triggering a security review is 8, the summed weights (3+5), by meeting or exceeding the threshold value, causes a security review to be performed to the frontend 402 and/or the backend services 404A-404D. In some implementations, the security review includes a review of all of the services in the end-to-end call graph 400 since even unmodified code may be vulnerable to changes in upstream or downstream services. In other implementations, the security review is performed to the services that have changed since the last security review was performed on those services. As noted, security review may include an automatic scan and/or a manual review of services in the end-to-end call graph 400.

It also must be noted that the end-to-end call graph 400 for the frontend 402 may vary based on the operation requested by the frontend 402. For example, a particular request by the frontend 402 may skip the service A 404A and be made directly to the service B 404B. As another example, another particular request from the frontend 402 may be made to a service E (not shown) before propagating to the service A 404A. As still another example, the frontend 402 may make a request in a different order than the order shown in FIG. 4 (e.g., service D 404D first, then the backend services 404B-404C, and then the service 404A). Thus, each frontend may have one or more end-to-end call graphs. Furthermore, each end-to-end call graph may be associated with a separate summed weight that reflects the summed weight of changes of services within that particular end-to-end call graph. Thus, when determining whether to conduct a security review of the services associated with the frontend 402, the calculation and summation of weights may be performed separately for each of the end-to-end call graphs associated with the frontend 402.

As an example use case of the techniques described, consider an order form application frontend for processing a consumer order. The application frontend may call an order processing service. The order processing service may call a payment processing service. The payment processing service may call a payment authorization service, and the payment authorization service may call a bank integration service. In the example use case, an update is made to the code of the order processing service. In this example implementation, weights are based at least in part on three different criteria discussed in the present disclosure, which are given a rating of 1 to 5 with 5 representing the most risk and 1 representing the least risk associated with the change. The first criteria is a sensitivity classification of data handled by the changed code, which because the order processing service handles raw credit card data (very sensitive data) is assigned rating of 5. The second criteria is the number of lines of code changed. In this use case, the size of the change is medium (e.g., 100 lines have been changed), which receives a rating of 2 out of 5. The third criteria is the track record of the software development team. In this case, the track record of the development team is average, which receives a rating of 2 out of 5.

Thus, the weight of the source code change is 5+2+2=9. However, the cumulative weights of previous source code changes of the services of the end-to-end request call path since the last security review is 26. Thus, the weight of the source code change is added to the other weights, which results in a total weight of 35, which is then compared to the security review threshold. In this use case, the security review threshold is 30. Consequently, an automated scan of the services in the end-to-end request call path is triggered and the total weights are reset to zero.

Figure 5:
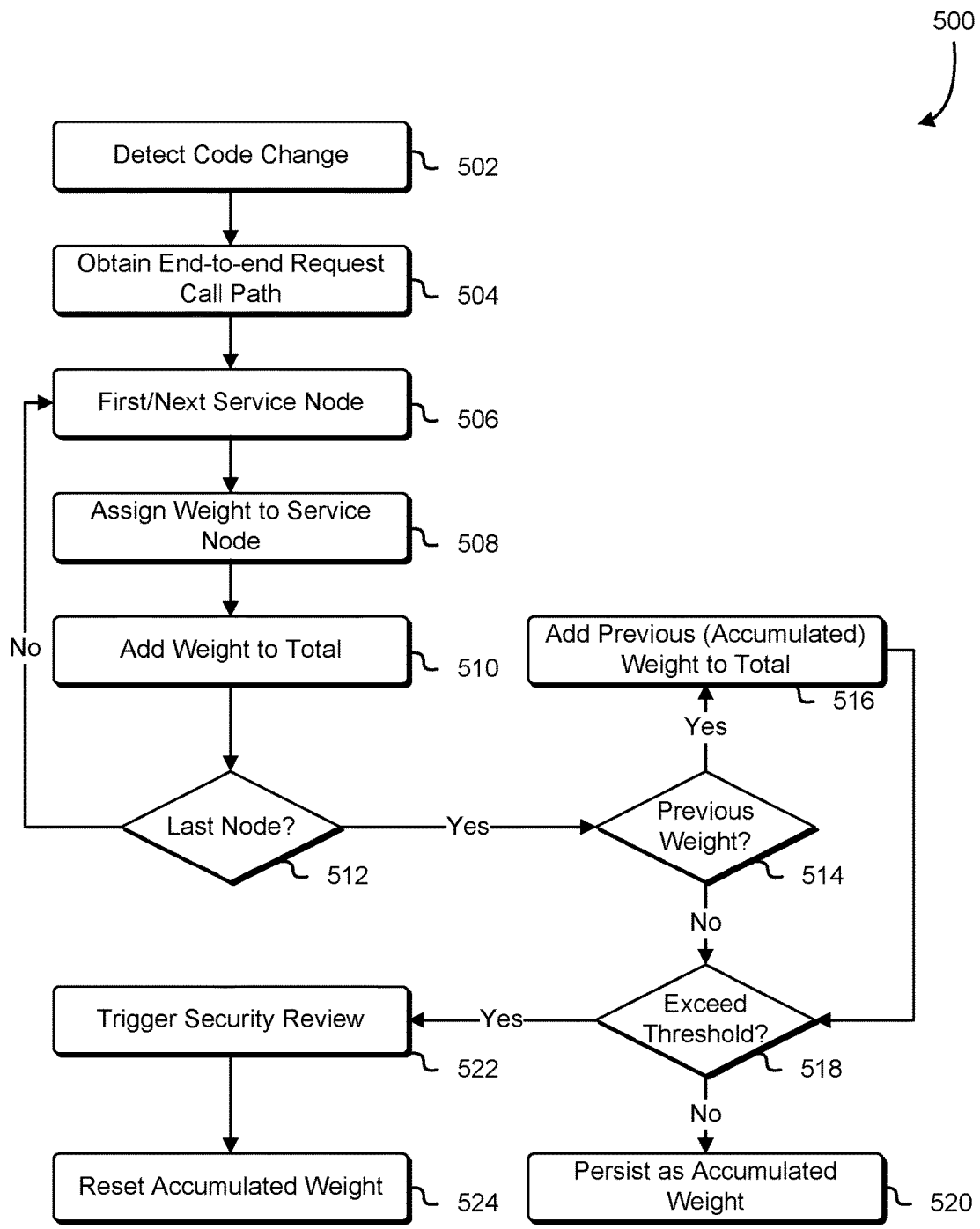
FIG. 5 is a flowchart that illustrates an example of monitoring and triggering a security review in accordance with an embodiment.

FIG. 5 is a flowchart illustrating an example of a process 500 for determining whether to trigger a security review in accordance with various embodiments. Some or all of the process 500 (or any other processes described, or variations and/or combinations of those processes) may be performed under the control of one or more computer systems configured with executable instructions and/or other data and may be implemented as executable instructions executing collectively on one or more processors. The executable instructions and/or other data may be stored on a non-transitory computer-readable storage medium (e.g., a computer program persistently stored on magnetic, optical, or flash media).

Figure 7:
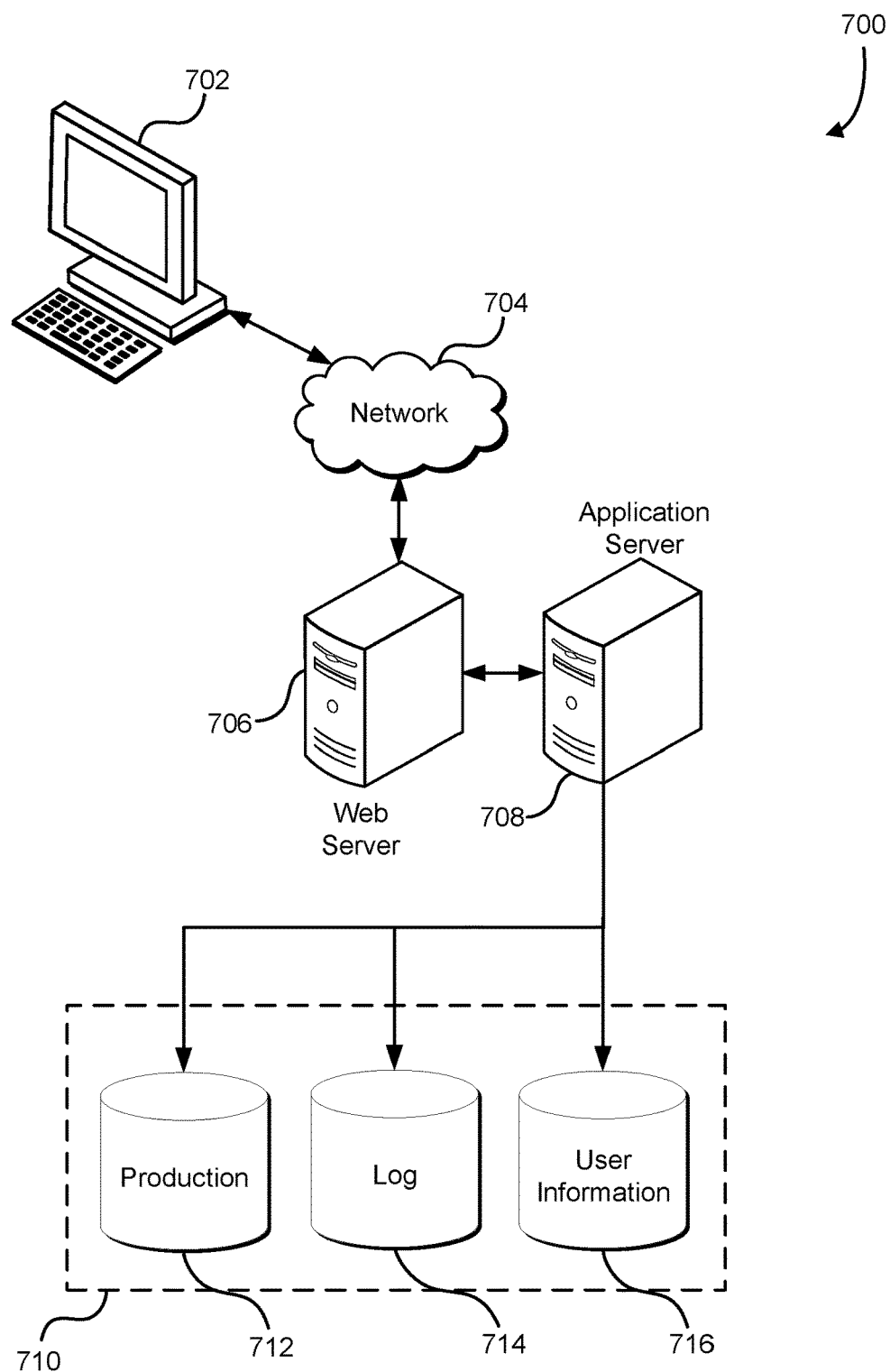
FIG. 7 illustrates an environment in which various embodiments can be implemented.

For example, some or all of process 500 may be performed by any suitable system, such as a server in a data center, by various components of the environment 700 described in conjunction with FIG. 7, such as the web server 706 or the application server 708, by multiple computing devices in a distributed system of a computing resource service provider, or by any electronic client device such as the electronic client device 702. The system performing the process 500, for example, may be a monitor similar to the monitor 106 of FIG. 1. The process 500 includes a series of operations wherein a change to source code associated with an application frontend is detected, an end-to-end call graph is determined, weights are assigned to code changes of services within the end-to-end call graph, the weights are aggregated with the previous accumulated weight, and a security review is triggered if the collective weights exceed a threshold.

In 502, the system performing the process 500 detects that a change has been made to source code of an application frontend, such as the frontend 302 of FIG. 3, or to a backend service associated with the application frontend, such as one of the backend services 304A-304D. Detection of the change may be made in various ways including, for example the system being notified that new source code has been uploaded to a repository. Note that the code change need not necessarily be an update to an existing application or service but may also include addition of a new application or service, replacement of an existing application or service, or removal of an existing application or service from the end-to-end call graph. In some implementations, an application, such as the monitor 106 of FIG. 1, monitors a repository for changes. In some implementations, the application monitors file paths or executable files associated with the running applications or services for changes in the executable or configuration files. It is contemplated that other methods of detecting code changes of applications and services may be used.

In 504, the system obtains the end-to-end request call graph associated with the frontend. As explained in the present disclosure, in some implementations a single frontend could be associated with a plurality of end-to-end request call graphs (for the frontend or for multiple frontends), and for such implementations the operations of 504-524 are repeated for each end-to-end request call graph. For example, some calls to services may be performed only upon fulfillment of certain conditions (e.g., as a result of evaluation of conditional statements in the source code), resulting in a plurality of possible call paths. Alternatively, in some implementations requests are tracked over a period of time by a service (recording service), thereby creating a map of the services that were called as a result of various requests made by the application frontend; the map may be translated into an end-to-end request call graph with the services as nodes, with each called service only appearing once in the graph. Note that in some implementations, the operations of 502 and 504 are reversed. For example, in an alternate implementation, for each end-to-end request call graph being monitored by the system performing the process 500, the system determines whether there has been a code change to one or more of the services of the end-to-end call graph and perform the operations of 506-524 accordingly.

In 506, the system may begin walking through the nodes in the end-to-end call graph, and, for each service represented by a node in the end-to-end call graph, determine a weight in 508 for the change to the service. That is, in 508, the system determines a weight to assign to the change to the source code of the service associated with the node. The weight determined may be based at least in part on an estimate of a security risk associated with the change. For example, a change to a single line of source code may be assigned a lower weight than a change to 100 or more lines of source code. Thus, the determined weight may be, at least in part, a calculation that takes into consideration the number of lines changed in the source code (e.g., 0.25*[number of lines changed]). Alternatively, the determined weight may be determined from a fixed range (e.g., a range of 1-5 where 1=1-5 lines changed, 2=6-15 lines changed, 3=16-40 lines changed, 4=41-99 lines changed, and 5=more than 100 lines of code changed). It is contemplated that other methods of determining weights based at least in part on a size of the code change may be used.

Additionally or alternatively, the weight may also take into consideration the sensitivity of data input, the sensitivity of the data output, and/or the sensitivity of the data processed by the application/service associated with the node. For example, applications and service in a particular computing environment may be assigned a particular sensitivity classification (e.g., red, yellow, green, a number between 1 and 5, etc.). In an example, the sensitivity classification may be determined based on characteristics indicated by the developer or development team that developed the application or service (e.g., via a questionnaire). Indicated characteristics include characteristics such as whether the application or service processes customer-sensitive data (e.g., credit card numbers, transaction history, medical history, personally identifiable information (PII), etc.), whether the application has access to cryptographic keys or other key materials (e.g., nonces, seeds, etc.), whether data obtained by the application or service is encrypted and not decrypted by the application or service (which may contribute to a lesser weight for the change), and other characteristics.

In some embodiments, the weight attributed to an application or service's access to cryptographic keys varies based on whether the access is direct or indirect access. For example, an application that utilizes an API that, if called, allows the application or service to encrypt or decrypt data without revealing the encryption/decryption key has indirect access to the encryption/decryption key. Such indirect access to an cryptographic key may be accorded less weight than direct access to the cryptographic key. A monitor, such as the monitor 106 of FIG. 1, may scan the source code to determine whether the application or service makes calls to such an API or may determine whether privileges assigned to the application or service grant access to such an API or grants direct access to the cryptographic key.

In some embodiments, the weight is additionally or alternatively affected by other factors, such as whether the application or service is being implemented on a different hardware platform, whether the application or service has been translated from one programming language to a different programming language, a frequency of which the developer or development team is associated with writing unsafe (e.g., poor security, memory leaks, hardcoded credentials, etc.) source code, whether the change includes a change to a cryptographic key or other key material. In some examples, if the developer or development team does not indicate the characteristics of the application or service, the sensitivity classification defaults to a classification that indicates the highest risk (out of an abundance of caution). In some embodiments, the sensitivity classification is modified based on an automatic scan of the source code for indications of sensitivity, such as names of variables that match keywords that indicate sensitive data (e.g., "key," "seed," "ssn," etc.), whether the application or service calls or accesses other applications, services, databases, or data already determined to be sensitive, and so on. In some implementations, the sensitivity classification is modified based on restrictions in an access policy associated with the application or service.

In some embodiments, the sensitivity classification is determined by passing characteristics of the source code (e.g., number of lines changed, type of data being processed, whether the application or service has access to cryptographic keys, length of time since the last security review, etc.) as input to a machine learning algorithm and receiving the weight/sensitivity classification as output from the algorithm. Such machine learning techniques may include supervised learning techniques, unsupervised learning techniques, semi-supervised learning techniques, transduction or transductive inference techniques, reinforcement learning, developmental learning, and the like. In various embodiments, the data is analyzed using one or more machine learning algorithms, such as: decision trees, association rule learning, deep learning, inductive logic programming, support vector machines, cluster analysis, Bayesian networks, naïve Bayes classifiers, learning automata, Gaussian process regression, nearest neighbor, random forest, ordinal classification, k-means clustering, lazy learning, artificial neural network, or generally any suitable machine learning algorithm or combination of algorithms. For example, a set of decision trees can be generated from historical data (e.g., previous classifications) by splitting the historical data into subsets based on an attribute value test and partitioned recursively until the splitting no longer adds value to the predictions.

In some implementations, the weight associated with a particular change to source code is affected by an amount of time since the last successful security review of the application/services associated with the end-to-end call graph. For example, a source code change of 10 lines of code for a service that was reviewed in a security review performed one week prior may be given a lower weight than a code change of 10 lines of code for a service whose last security review was performed over a year ago. Additionally or alternatively, in some implementations the length of time that a particular service or application has been running reduces the weight. For example, relatively minor changes (e.g., less than five lines of code) to an application/service that has been actively running without security issues for a certain amount of time or for a certain number of uses may be accorded a lower weight than an application/service that has been running for a relatively short period of time (e.g., four weeks or less). In this manner, minor changes to application/services that have been well tested may be given lower weights than minor changes to applications that are sparsely tested. In some embodiments, if the application/service that has changed has already been at least partly reviewed and verified or certified as acceptable by an information security member or team (e.g., InfoSec) since the source code change, the change is accorded a lower weight compared to a change that has not yet been reviewed by an entity.

In 510, the weight determined in 508 may be added to total weight of the end-to-end call graph. In this way, the weight of each service increments the total weight by the amount of the weight. In 512, the system performing the process 500 determines whether the last node in the end-to-end request call graph has been reached and processed in the previous operations. If not, then the system may return to 506 to check for changes associated with the next service node in the graph. Note that in some implementations, if the process 500 is triggered for each change to source code of a service, it may be unnecessary to walk through other nodes in the end-to-end call graph since the weights associated with previous changes may have already been factored into the wait for the end-to-end call graph; thus, at least some of such implementations omit the operations of 512. On the other hand, it is contemplated that in some implementations certain code changes could be changes made to library files or other code files which have dependencies in multiple services/applications in the end-to-end call path; consequently, such implementations would include the operations of walking through the source code of each service in the end-to-end call path to determine the weights of the affected services/applications.

On the other hand, if in 512 it is determined that the last node in the end-to-end request call path has been processed, the system performing the process 500 may proceed to 514.

In 514, the system may determine whether any weights associated with changes to services in the end-to-end request call path that have occurred since the last security review have been added into the total weight of the end-to-end call graph. If no such previous weights exist, the system may proceed to 518. Otherwise, if such previous weights exist and have not been aggregated with the total, the system proceeds to 516 to add the previous weights to the total weight of the end-to-end call graph and proceeds to 518. Note that in some implementations, rather than an accumulated weight specific to the particular end-to-end request call path, the calculated weight is performed for each service/application that is changed since the previous security review of the service/application. In this manner, rather than keeping track of an accumulated weight for the overall end-to-end request call path, the accumulated weight may be calculated on the fly each time a new source code change is detected. In such an implementation, the operations of 508-512 add the weights of the services/applications in the end-to-end request call graph that have changed since the most recent security review. In this implementation, once a security review is triggered, the individual weights of the services/applications may be reset.

In 518, the system performing the process 500 determines whether the total weight of the end-to-end call graph reaches a value relative to a threshold. For example, in some implementations, the value relative to the threshold is a value that exceeds the threshold. Alternatively, in some implementations, the value relative to the threshold is a value that meets or exceeds the threshold. Note that other techniques for assigning weights and comparing with threshold are contemplated. For example, rather than starting from zero and accumulating weights until they meet or exceed a threshold, a total weight for an end-to-end call graph may start with a baseline weight (e.g., 100), and weights may be deducted (rather than added) to the total weight until the total weight falls below a lower limit or negative threshold (e.g., zero, 20, −35, etc.).

If the total weight reaches the value relative to the threshold, the system may proceed to 520, whereupon a security review may not be triggered and the accumulated weights are persisted until the next time the process 500 is executed by the system. Otherwise, if the total weight does reach the value relative to the threshold, the system may proceed to 522. In 522, the system may trigger a security review of the applications and/or services associated with the end-to-end call graph. In some implementations, triggering the security review is caused by sending a notification (e.g., signal, text message, email, API call, remote procedure call, modifying a field or flag in a shared database table, or some other manner of notification) to an entity responsible for performing the security review. In some embodiments, the notification includes one or more application identifiers (IDs) associated with the applications and/or services to be reviewed. In some embodiments, the entity is an individual, whereas in other embodiments the entity is a software application that automatically performs security reviews in the manner described in the present disclosure. In some embodiments, the system sends a notification to multiple entities, some of which may be individuals and some of which may be hardware or software entities, and in some of these embodiments each of the multiple entities are notified so as to perform a different type of security review from other of the multiple entities; e.g., the software entity may parse application code, looking for hardcoded credentials, flagging certain items for secondary review/confirmation by an individual entity. In some embodiments, the system performing the process 500 also performs the security review, and in such embodiments the operations of 522 involve commencing the security review.

In 524, the system resets the total weight such that upon subsequent detection of a code change and performance of the process 500, the total weight starts with a baseline value (e.g., zero, 100, etc.). In some embodiments, the baseline value is dependent upon characteristics of the application and/or services in the end-to-end call graph. For example, if the applications and/or services are deemed a low security risk, the baseline value might be zero. As another example, if the applications and/or services are deemed a medium security risk, the baseline value be at 20, thereby causing security review to be triggered sooner (e.g., after relatively fewer source code changes than if the baseline had been zero). Note that one or more of the operations performed in 502-524 may be performed in various orders and combinations, including in parallel.

Figure 6:
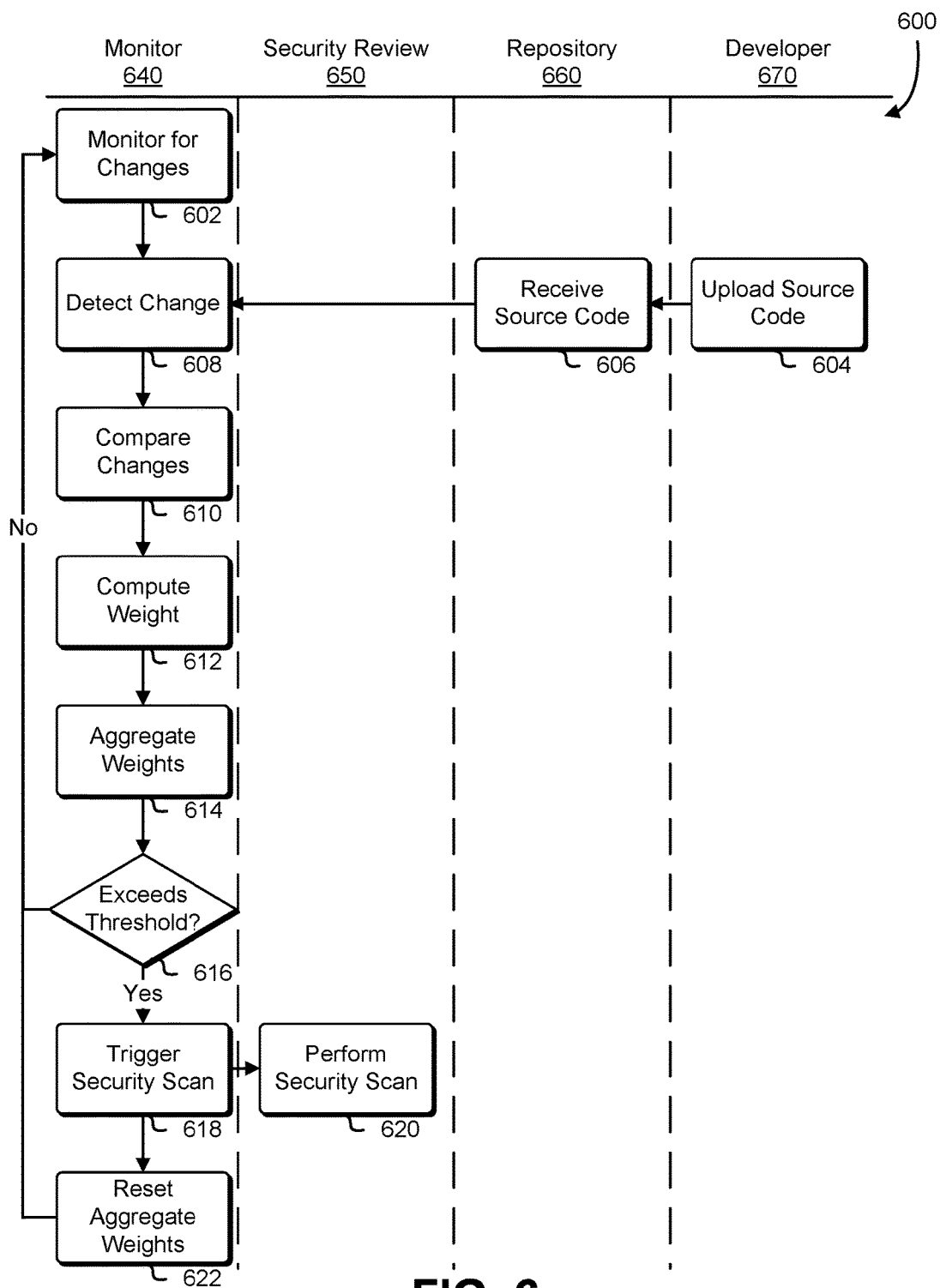
FIG. 6 is a swim diagram that illustrates an example workflow in accordance with an embodiment.

FIG. 6 illustrates swim diagram 600 of an embodiment of the present disclosure. Specifically, FIG. 6 depicts the interaction between a monitor 640, a security review entity 650, a repository 660, and a software developer 670 in an embodiment of the present disclosure. The monitor 640 may be similar to the monitor 106 of FIG. 1, the security review entity 650 may be similar to an entity performing a security review 112 of FIG. 1, and the repository 660 may be similar to the repository 104 of FIG. 1. The software developer 670 may be at least one of a set of individuals responsible for producing the source code from which the software applications and/or services described in the present disclosure are derived. For example, the software developer may be a person involved in research, design, programming, and testing of one or more of the software applications and/or services in the end-to-end call path.

In 602, the monitor 640, similar to the system performing the process 500 of FIG. 5, begins monitoring for changes to source code of an application and/or services associated with an end-to-end call graph. In 604, the software developer 670 uploads/causes to be stored new or updated source code for one or more of the applications and or services associated with the end-to-end call graph. The repository 660 receives and stores the new or updated source code in 606.

Storage of the source code in the repository 660 causes the monitor 640, in 608, to detect that the source code is new or has been updated. As described in the present disclosure, the detection may be performed in various ways, such as a notification received from the repository 660, polling the repository 660 for the most recent version of the source code and comparing that version with a last recent version known by the monitor 640, and so on. In 610, the monitor 640 compares the source code update with the previous version of the source code and, in 612, assigns a weight based on various factors such as those described in the present disclosure. In cases where a new application or service is added to the end-to-end call graph and there is no previous version, the weight may be determined in various ways including assigning a default weight to the applications/service, assigning a weight based on the size of application/service and/or number of lines of source code in the new application/service, and so on.

In 614, the monitor 640 aggregates the weights associated with changes to the applications and/or services in the end-to-end call path that were made since the last security review of the applications and/or services in the end-to-end call path. In 616, the monitor 640 determines whether the aggregated weight has reached a value relative to a threshold (e.g., meets or exceeds the threshold, exceeds the threshold, etc.) and, if not, resumes monitoring for changes to source code in 602. Otherwise, if the aggregated weight reaches the value relative to the threshold, in 618, the monitor causes the security review entity 650 to perform a security review 620 in one of the manners described in the present disclosure.

The security review having been triggered, the monitor 620 resets the aggregate weights in 622 and returns to monitoring source code for changes. Note that one or more of the operations performed in 602-622 may be performed in various orders and combinations including in parallel. For example, the monitor 640 may perform the operations of 622 in parallel with the security review being performed in 620 by the security review entity 650.

Note that, in the context of describing disclosed embodiments, unless otherwise specified, use of expressions regarding executable instructions (also referred to as code, applications, agents, etc.) performing operations that "instructions" do not ordinarily perform unaided (e.g., transmission of data, calculations, etc.) denote that the instructions are being executed by a machine, thereby causing the machine to perform the specified operations.

Embodiments of the disclosure can be described in view of the following clauses:

1. A computer-implemented method, comprising:
   determining an end-to-end request processing graph for an application frontend of a website, nodes of the end-to-end request processing graph including the application frontend and one or more services that perform processing operations for the application frontend;
   identifying a change to a service that corresponds to a node in the end-to-end request processing graph;
   assigning a weight associated with the change, the weight indicating a security risk of the change;
   aggregating the weight with an accumulated weight of changes to services of the end-to-end request processing graph to produce a new accumulated weight; and
   triggering, based at least in part on the accumulated weight reaching a value relative to a threshold value, a security review of at least the application frontend.

2. The computer-implemented method of clause 1, wherein the weight is based at least in part on one or more of:
   a size of the change to source code of the service,
   a privilege associated with the service, or
   sensitivity of data processed by the service.

3. The computer-implemented method of clause 1 or 2, wherein the security review includes one or more of:
   an automated scan of the application frontend,
   a manual security review of the application frontend, or
   an automated scan of the one or more services.

4. The computer-implemented method of clauses 2 to 3, wherein the change is identified as a result of storage of source code of the service in a repository.

5. A system, comprising:
   at least one computing device that implement one or more services, wherein the one or more services:
   determine an end-to-end request path associated with an application frontend;
   identify a change to a service in the end-to-end request path;
   determine a value to associate with the change, the value based at least in part on characteristics of the change;
   aggregate the value with collective weights of code changes of services in the end-to-end request path; and determine, based at least in part on the collective weights reaching a value relative to a threshold value, whether to trigger a security review.
6. The system of clause 5, wherein the value based at least in part on the characteristics of the change is a value associated with a difference between a current size of source code and a previous size of the source code.
7. The system of clause 5 or 6, wherein the one or more services further reset the collective weights of the code changes of the services in the end-to-end request path to a baseline value.
8. The system of any of clauses 5 to 7, wherein the value based at least in part on the characteristics of the change is a value that indicates a sensitivity of data processed by the service.
9. The system of clause 8, wherein the one or more services further determine the sensitivity of the data being based at least in part on passing the characteristics of the change as input to a machine learning algorithm.
10. The system of any of clauses 5 to 9, wherein the one or more services further, as a result of determining to trigger the security review, send a notification to a security review entity to trigger the security review.
11. The system of clause 10, wherein the security review includes an automated review of at least the application frontend associated with the end-to-end request path.
12. The system of any of clauses 5 to 11, wherein the one or more services that determine the end-to-end request path, as a result of a request call made by the application frontend to a backend service, trace a set of request calls made to one or more backend services to determine the end-to-end request path.
13. The system of clause 12, wherein the set of request calls include at least one request identifier that associates the set of request calls with the request call made by the application frontend.
14. A non-transitory computer-readable storage medium having stored thereon executable instructions that, as a result of being executed by one or more processors of a computer system, cause the computer system to at least:
obtain a graph of interrelated computer-executable processes;
determine that a change has occurred to one of the interrelated computer-executable processes in the graph;
determine, based at least in part on the change, a weight of the one of the interrelated computer-executable processes; and
determine, based at least in part on the weight, to perform an action that indicates a level of importance of performing a security review of one or more of the interrelated computer-executable processes.
15. The non-transitory computer-readable storage medium of clause 14, wherein:
the interrelated computer-executable processes include a first computer-executable process and a second computer-executable process; and
an edge in the graph indicates that the first computer-executable process causes the second computer-executable process to perform an operation.
16. The non-transitory computer-readable storage medium of clause 14 or 15, wherein the weight is determined based at least in part on whether the one of the interrelated computer-executable processes has previously passed a security assurance review.
17. The non-transitory computer-readable storage medium of any of clauses 14 to 16, wherein the weight is determined based at least in part on whether the one of the interrelated computer-executable processes has access to a cryptographic key.
18. The non-transitory computer-readable storage medium of any of clauses 14 to 17, wherein the executable instructions that cause the computer system to trigger the security review include instructions that cause the computer system to send a notification to an automated security review entity thereby triggering the automatic security review entity to perform the security review of the one or more of the interrelated computer-executable processes.
19. The non-transitory computer-readable storage medium of any of clauses 14 to 18, wherein the weight is determined based at least in part on a track record of secure coding by a developer of the one of the interrelated computer-executable processes.
20. The non-transitory computer-readable storage medium of any of clauses 14 to 19, wherein the change is an update to cryptographic key material used by the one of the interrelated computer-executable processes.

FIG. 7 illustrates aspects of an example environment 700 for implementing aspects in accordance with various embodiments. As will be appreciated, although a web-based environment is used for purposes of explanation, different environments may be used, as appropriate, to implement various embodiments. The environment includes an electronic client device 702, which can include any appropriate device operable to send and/or receive requests, messages, or information over an appropriate network 704 and convey information back to a user of the device. Examples of such client devices include personal computers, cell phones, handheld messaging devices, laptop computers, tablet computers, set-top boxes, personal data assistants, embedded computer systems, electronic book readers, and the like. The network 704 can include any appropriate network, including an intranet, the Internet, a cellular network, a local area network, a satellite network, or any other network and/or combination thereof. Components used for such a system can depend at least in part upon the type of network and/or environment selected. Many protocols and components for communicating via such a network are well known and will not be discussed in detail. Communication over the network 704 can be enabled by wired or wireless connections and combinations thereof. In an embodiment, the network 704 includes the Internet and/or other publicly addressable communications network, as the environment includes a web server 706 for receiving requests and serving content in response thereto, although for other networks an alternative device serving a similar purpose could be used as would be apparent to one of ordinary skill in the art.

The illustrative environment includes an application server 708 and a data store 710. It should be understood that there can be several application servers, layers, or other elements, processes or components, which may be chained or otherwise configured, which can interact to perform tasks such as obtaining data from an appropriate data store. Servers, as used, may be implemented in various ways, such as hardware devices or virtual computer systems. In some contexts, "servers" may refer to a programming module being executed on a computer system. As used, unless otherwise stated or clear from context, the term "data store" refers to any device or combination of devices capable of storing, accessing, and retrieving data, which may include any combination and number of data servers, databases, data storage devices, and data storage media, in any standard, distributed, virtual, or clustered environment. The application server 708 can include any appropriate hardware, software, and firmware for integrating with the data store 710 as needed to execute aspects of one or more applications for the electronic client device 702, handling some or all of the data access and business logic for an application. The application server 708 may provide access control services in cooperation with the data store 710 and is able to generate content including, text, graphics, audio, video, and/or other content usable to be provided to the user, which may be served to the user by the web server 706 in the form of HyperText Markup Language ("HTML"), Extensible Markup Language ("XML"), JavaScript, Cascading Style Sheets ("CS S"), JavaScript Object Notation (JSON), and/or another appropriate client-side structured language. Content transferred to a client device may be processed by the electronic client device 702 to provide the content in one or more forms including, forms that are perceptible to the user audibly, visually, and/or through other senses. The handling of all requests and responses, as well as the delivery of content between the electronic client device 702 and the application server 708, can be handled by the web server 706 using PHP: Hypertext Preprocessor ("PHP"), Python, Ruby, Perl, Java, HTML, XML, JSON, and/or another appropriate server-side structured language in this example. Further, operations described as being performed by a single device may, unless otherwise clear from context, be performed collectively by multiple devices, which may form a distributed and/or virtual system.

The data store 710 can include several separate data tables, databases, data documents, dynamic data storage schemes, and/or other data storage mechanisms and media for storing data relating to a particular aspect of the present disclosure. For example, the data store 710 may include mechanisms for storing production data 712 and user information 716, which can be used to serve content for the production side. The data store 710 also is shown to include a mechanism for storing log data 714, which can be used for reporting, analysis, or other purposes. It should be understood that there can be many other aspects that may need to be stored in the data store 710, such as page image information and access rights information, which can be stored in any of the above listed mechanisms as appropriate or in additional mechanisms in the data store 710. The data store 710 is operable, through logic associated therewith, to receive instructions from the application server 708 and obtain, update, or otherwise process data in response thereto. The application server 708 may provide static, dynamic, or a combination of static and dynamic data in response to the received instructions. Dynamic data, such as data used in web logs (blogs), shopping applications, news services, and other applications may be generated by server-side structured languages as described or may be provided by a content management system ("CMS") operating on, or under the control of, the application server 708. In one embodiment, a user, through a device operated by the user, can submit a search request for a certain type of item. In this embodiment, the data store 710 might access the user information 716 to verify the identity of the user and can access the catalog detail information to obtain information about items of that type. The information then can be returned to the user, such as in a results listing on a web page that the user is able to view via a browser on the electronic client device 702. Information for a particular item of interest can be viewed in a dedicated page or window of the browser. It should be noted, however, that embodiments of the present disclosure are not necessarily limited to the context of web pages, but may be more generally applicable to processing requests in general, where the requests are not necessarily requests for content.

Each server typically will include an operating system that provides executable program instructions for the general administration and operation of that server and typically will include a computer-readable storage medium (e.g., a hard disk, random access memory, read only memory, etc.) storing instructions that, when executed (i.e., as a result of being executed) by a processor of the server, allow the server to perform its intended functions.

The environment, in one embodiment, is a distributed and/or virtual computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 7. Thus, the depiction in FIG. 7 should be taken as being illustrative in nature and not limiting to the scope of the disclosure.

The various embodiments further can be implemented in a wide variety of operating environments, which in some embodiments can include one or more user computers, computing devices, or processing devices that can be used to operate any of a number of applications. User or client devices can include any of a number of computers, such as desktop, laptop, or tablet computers running a standard operating system, as well as cellular, wireless, and handheld devices running mobile software and capable of supporting a number of networking and messaging protocols. Such a system also can include a number of workstations running any of a variety of commercially available operating systems and other known applications for purposes such as development and database management. These devices also can include other electronic devices, such as dummy terminals, thin-clients, gaming systems, and other devices capable of communicating via a network. These devices also can include virtual devices such as virtual machines, hypervisors, and other virtual devices capable of communicating via a network.

Various embodiments of the present disclosure utilize a network that would be familiar to those skilled in the art for supporting communications using any of a variety of commercially available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS"), and AppleTalk. The network 704 can be, for example, a local area network, a wide-area network, a virtual private network, the Internet, an intranet, an extranet, a public switched telephone network, an infrared network, a wireless network, a satellite network, and any combination thereof. In some embodiments, connection-oriented protocols may be used to communicate between network endpoints. Connection-oriented protocols (sometimes called connection-based protocols) are capable of transmitting data in an ordered stream. Connection-oriented protocols can be reliable or unreliable. For example, the TCP protocol is a reliable connection-oriented protocol. Asynchronous Transfer Mode ("ATM") and Frame Relay are unreliable connection-oriented protocols. Connection-oriented protocols are in contrast to packet-oriented protocols such as UDP that transmit packets without a guaranteed ordering.

In embodiments utilizing a web server, the web server can run any of a variety of server or mid-tier applications, including Hypertext Transfer Protocol ("HTTP") servers, FTP servers, Common Gateway Interface ("CGI") servers, data servers, Java servers, Apache servers, and business application servers. The server(s) also may be capable of executing programs or scripts in response to requests from user devices, such as by executing one or more web applications that may be implemented as one or more scripts or programs written in any programming language, such as Java®, C, C#, or C++, or any scripting language, such as Ruby, PHP, Perl, Python, or TCL, as well as combinations thereof. The server(s) may also include database servers, including those commercially available from Oracle®, Microsoft®, Sybase®, and IBM® as well as open-source servers such as MySQL, Postgres, SQLite, MongoDB, and any other server capable of storing, retrieving, and accessing structured or unstructured data. Database servers may include table-based servers, document-based servers, unstructured servers, relational servers, non-relational servers, or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network 704. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, a central processing unit ("CPU" or "processor"), an input device (e.g., a mouse, keyboard, controller, touch screen, or keypad), and an output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within a working memory device, including an operating system and application programs, such as a client application or web browser. In addition, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as, volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD), or other optical storage, magnetic cassettes, magnetic tape, magnetic disk storage, or other magnetic storage devices or any other medium which can be used to store the desired information and which can be accessed by the system device. Based on the disclosure and teachings provided, a person of ordinary skill in the art will appreciate other ways and/or methods to implement the various embodiments.

The specification and drawings are, accordingly, to be regarded in an illustrative rather than a restrictive sense. However, it will be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions, and equivalents falling within the spirit and scope of the invention, as defined in the appended claims.

The use of the terms "a," "an," and "the" and similar referents in the context of describing the disclosed embodiments (especially in the context of the following claims) are to be construed to cover both the singular and the plural, unless otherwise indicated or clearly contradicted by context. The terms "comprising," "having," "including," and "containing" are to be construed as open-ended terms (i.e., meaning "including, but not limited to,") unless otherwise noted. The term "connected," where unmodified and referring to physical connections, is to be construed as partly or wholly contained within, attached to, or joined together, even if there is something intervening. Recitation of ranges of values are merely intended to serve as a shorthand method of referring individually to each separate value falling within the range, unless otherwise indicated and each separate value is incorporated into the specification as if it were individually recited. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," is understood with the context as used in general to present that an item, term, etc., may be either A or B or C, or any nonempty subset of the set of A and B and C, unless specifically stated otherwise or otherwise clearly contradicted by context. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present. In addition, unless otherwise noted or contradicted by context, the term "plurality" indicates a state of being plural (e.g., "a plurality of items" indicates multiple items). The number of items in a plurality is at least two, but can be more when so indicated either explicitly or by context.

Operations of processes described can be performed in any suitable order unless otherwise indicated or otherwise clearly contradicted by context. Processes described (or variations and/or combinations thereof) may be performed under the control of one or more computer systems configured with executable instructions and may be implemented as code (e.g., executable instructions, one or more computer programs, or one or more applications) executing collectively on one or more processors, by hardware or combinations thereof. The code may be stored on a computer-readable storage medium, for example, in the form of a computer program comprising instructions executable by one or more processors. The computer-readable storage medium may be non-transitory. In some embodiments, the code is stored on set of one or more non-transitory computer-readable storage media having stored thereon executable instructions that, when executed (i.e., as a result of being executed) by one or more processors of a computer system, cause the computer system to perform operations described herein. The set of non-transitory computer-readable storage media may comprise multiple non-transitory computer-readable storage media and one or more of individual non-transitory storage media of the multiple non-transitory computer-readable storage media may lack all of the code while the multiple non-transitory computer-readable storage media collectively store all of the code. Further, in some embodiments, the executable instructions are executed such that different instructions are executed by different processors. As an illustrative example, a non-transitory computer-readable storage medium may store instructions. A main CPU may execute some of the instructions and a graphics processor unit may execute other of the instructions. Generally, different components of a computer system may have separate processors and different processors may execute different subsets of the instructions.

Accordingly, in some embodiments, computer systems are configured to implement one or more services that singly or collectively perform operations of processes described herein. Such computer systems may, for instance, be configured with applicable hardware and/or software that enable the performance of the operations. Further, computer systems that implement various embodiments of the present disclosure may, in some embodiments, be single devices and, in other embodiments, be distributed computer systems comprising multiple devices that operate differently such that the distributed computer system performs the operations described and such that a single device may not perform all operations.

The use of any examples, or exemplary language (e.g., "such as") provided, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described, including the best mode known to the inventors for carrying out the invention. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated or otherwise clearly contradicted by context.

All references, including publications, patent applications, and patents, cited are hereby incorporated by reference to the same extent as if each reference were individually and specifically indicated to be incorporated by reference and were set forth in its entirety.

What is claimed is:

1. A computer-implemented method, comprising:
   determining an end-to-end request processing graph for an application frontend of a website, nodes of the end-to-end request processing graph including the application frontend and one or more services that perform processing operations for the application frontend;
   identifying a change to a service that corresponds to a node in the end-to-end request processing graph;
   assigning a weight associated with the change, the weight indicating a security risk of the change, the weight being based at least in part on a difference between a current size of source code of the service and a previous size of the source code of the service;
   aggregating the weight with an accumulated weight of changes to services of the end-to-end request processing graph to produce a new accumulated weight; and
   triggering, based at least in part on the new accumulated weight reaching a value relative to a threshold value, a security review of at least the application frontend.

2. The computer-implemented method of claim 1, wherein the weight is further based at least in part on one or more of:
   a privilege associated with the service, or
   sensitivity of data processed by the service.

3. The computer-implemented method of claim 1, wherein the security review includes one or more of:
   an automated scan of the application frontend,
   a manual security review of the application frontend, or
   an automated scan of the one or more services.

4. The computer-implemented method of claim 1, wherein the change is identified as a result of storage of source code of the service in a repository.

5. A non-transitory computer-readable storage medium having stored thereon executable instructions that, as a result of being executed by one or more processors of a computer system, cause the computer system to at least:
   determine an end-to-end request processing graph for an application frontend of a website, nodes of the end-to-end request processing graph including the application frontend and one or more services that perform processing operations for the application frontend;
   identify a change to a service that corresponds to a node in the end-to-end request processing graph;
   assign a weight associated with the change, the weight indicating a security risk of the change, the weight being based at least in part on a difference between a current size of source code of the service and a previous size of the source code of the service;

aggregate the weight with an accumulated weight of changes to services of the end-to-end request processing graph to produce a new accumulated weight; and trigger, based at least in part on the new accumulated weight reaching a value relative to a threshold value, a security review of at least the application frontend.

6. The non-transitory computer-readable storage medium of claim 5, wherein:
the one or more services include a first computer-executable process and a second computer-executable process; and
an edge in the end-to-end request processing graph indicates that the first computer-executable process causes the second computer-executable process to perform an operation.

7. The non-transitory computer-readable storage medium of claim 5, wherein the weight is determined based at least in part on whether one of the one or more services has previously passed a security assurance review.

8. The non-transitory computer-readable storage medium of claim 5, wherein the weight is determined based at least in part on whether one of the one or more services has access to a cryptographic key.

9. The non-transitory computer-readable storage medium of claim 5, wherein the executable instructions that cause the computer system to trigger the security review include instructions that cause the computer system to send a notification to an automated security review entity thereby triggering the automated security review entity to perform the security review of one or more of the one or more services.

10. The non-transitory computer-readable storage medium of claim 5, wherein the weight is determined based at least in part on a track record of secure coding by a developer of one of the one or more services.

11. The non-transitory computer-readable storage medium of claim 5, wherein the change is an update to cryptographic key material used by one of the one or more services.

12. A system, comprising:
at least one computing device that implement one or more services, wherein the one or more services:
determine an end-to-end request processing graph for an application frontend of a website, nodes of the end-to-end request processing graph including the application frontend and one or more services that perform processing operations for the application frontend;
identify a change to a service that corresponds to a node in the end-to-end request processing graph;
assign a weight associated with the change, the weight indicating a security risk of the change, the weight being based at least in part on a difference between a current size of source code of the service and a previous size of the source code of the service;
aggregate the weight with an accumulated weight of changes to services of the end-to-end request processing graph to produce a new accumulated weight; and
trigger, based at least in part on the new accumulated weight reaching a value relative to a threshold value, a security review of at least the application frontend.

13. The system of claim 12, wherein the change is identified as a result of storage of source code of the service in a repository.

14. The system of claim 12, wherein the one or more services further reset the new accumulated weight to a baseline value.

15. The system of claim 12, wherein the weight is further based at least in part on a value that indicates a sensitivity of data processed by the service.

16. The system of claim 15, wherein the one or more services further determine the sensitivity of the data being based at least in part on passing characteristics of the change as input to a machine learning algorithm.

17. The system of claim 12, wherein the one or more services further, as a result of determining to trigger the security review, send a notification to a security review entity to trigger the security review.

18. The system of claim 17, wherein the security review includes an automated review of at least the application frontend associated with the end-to-end request processing graph.

19. The system of claim 12, wherein the one or more services that determine the end-to-end request processing graph, as a result of a request call made by the application frontend to a backend service, trace a set of request calls made to one or more backend services to determine the end-to-end request processing graph.

20. The system of claim 19, wherein the set of request calls include at least one request identifier that associates the set of request calls with the request call made by the application frontend.

* * * * *